United States Patent Office 3,377,463
Patented Apr. 9, 1968

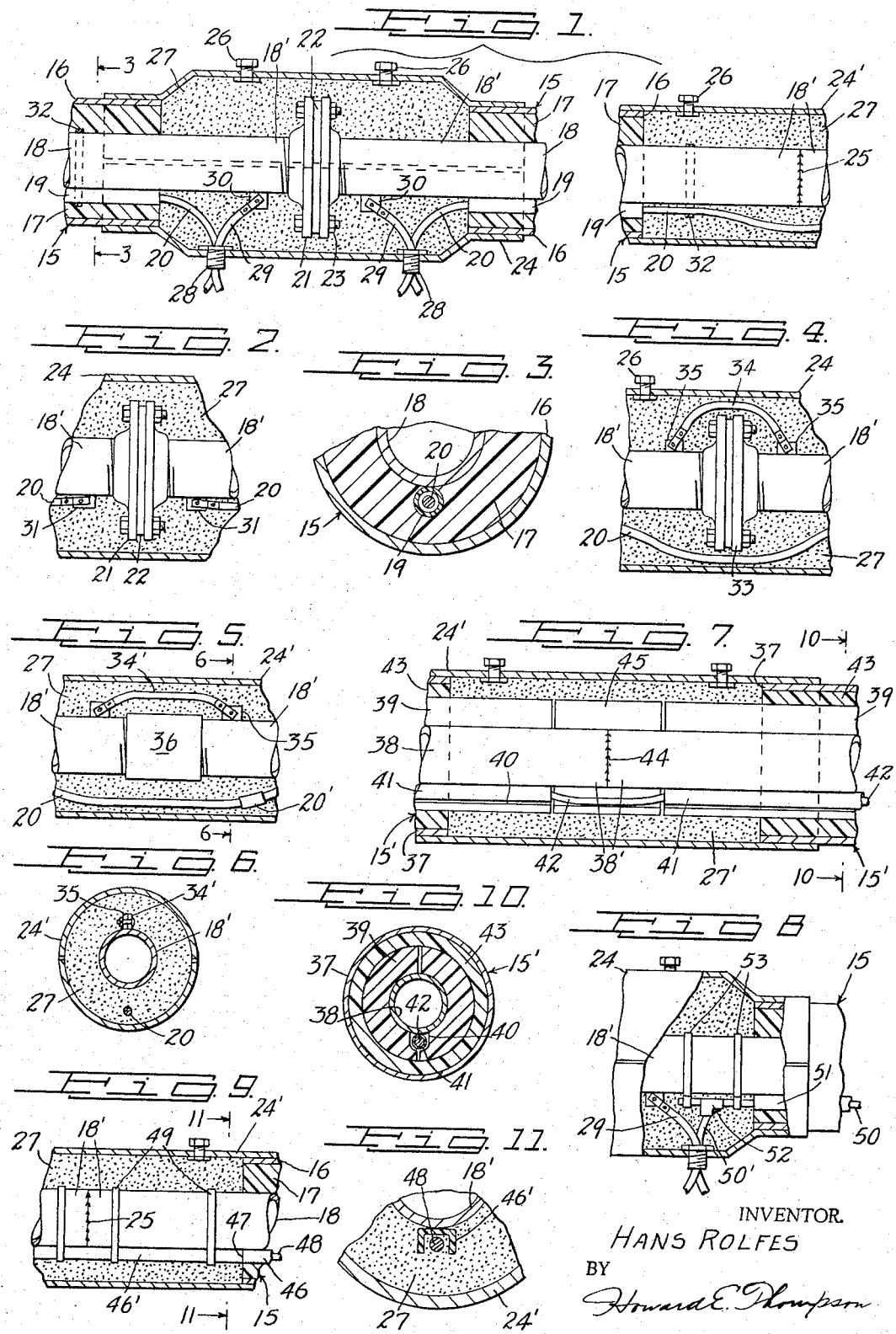

3,377,463
PREFABRICATED ELECTRIC RESISTANCE PIPE HEATING SYSTEM
Hans Rolfes, Bronx, N.Y., assignor to Trans Continental Electronics Corp., New York, N.Y., a corporation of New Jersey
Filed June 21, 1965, Ser. No. 465,619
7 Claims. (Cl. 219—300)

ABSTRACT OF THE DISCLOSURE

A system employing means for heating fluid mediums passing through an elongated circulating pipe to control temperature of such medium, wherein prefabricated insulated pipe units are employed, the units including cables arranged in insulating elements and extending longitudinally of the pipe, with coupling stations joining the pipe units, with one end of the cable coupled with the pipe at predetermined coupling stations and other stations having means introducing the cables to the system. Still further, predetermined stations include means, such as jumpers, for electrically coupling pipes of adjacent units. The pipes themselves are used as electric resistance heating means and a low voltage heating current is supplied thereto from a suitable transformer through the cables.

---

This invention relates to the heating of fluid mediums passing through a circulating pipe to control temperature of such mediums. More particularly, the invention deals in a system employing prefabricated insulated pipe units or sections incorporating therein cables arranged in insulated tubes and, wherein, the pipe itself is used as an electric resistance and a low voltage, normally supplied from a special transformer, is connected to a predetermined number of sections or units. Further, the invention deals with a system, wherein stray currents are eliminated by electrically insulated flanges coupling the pipe ends of adjacent units or sections.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a bracketed diagrammatic sectional view showing one form of construction, with parts shown in elevation.

FIG. 2 is a sectional view, similar to the left-hand showing of FIG. 1, illustrating ends of the circuits to joined units or sections.

FIG. 3 is a partial enlarged section on the line 3—3 of FIG. 1.

FIG. 4 is a view, similar to FIG. 2, showing a jumper cable to insure positive electric connection and to avoid localized overheating at the pipe coupling.

FIG. 5 is a view, similar to FIG. 4, showing a modified form of pipe coupling.

FIG. 6 is a section on line 6—6 of FIG. 5.

FIG. 7 is a sectional view of modified form of units and coupling connection therefor.

FIG. 8 is a view, similar to one end portion of the showing at the left of FIG. 1, illustrating a modified form of cable coupling.

FIG. 9 is a view, generally similar to the right-hand showing of FIG. 1, illustrating a modified form of cable insulation.

FIG. 10 is a section on the line 10—10 of FIG. 7; and

FIG. 11 is a partial section on the line 11—11 of FIG. 9 on an enlarged scale.

Considering FIGS. 1 to 3, inclusive, at 15 is shown, in part, prefabricated units or sections, each section comprising an outer tubular casing 16 of waterproof material and such materials, for example, as extruded polyvinylchloride can be used. Arranged within the casing 16 is a suitable insulating material 17 which is foamed in place or, in other words, can be poured at the shop and such materials as polyurethane can be used. Arranged within the insulation 17 is an electric resistance pipe 18. Arranged longitudinally of the pipe 18 within the insulation 17 is a non-metallic electrically insulating conduit 19, in which an electric low voltage cable 20 is arranged. The surface of this cable, in some instances, will be insulated with a suitable plastic, such as silicon or the like. In operating under low temperatures, the conduit 19 can be composed of such materials as polyvinylchloride or the like; whereas, in operating at high temperatures, such materials as ceramic, asbestos, fiberglass, glass and the like can be employed.

Considering FIG. 1 of the drawing, it will appear that the pipes of the units or sections have extended ends 18' and the end of one unit or section is coupled with the other unit or section by a flange coupling 21 at the right of FIG. 1 and in FIG. 2 and this coupling includes insulation, as illustrated in part, at 22, it being apparent to those skilled in the art that insulation will also prevail around the bolts 23 used in coupling the flanges together. Throughout the system, the various units or sections as, for example, at 15, are joined in what can be generally referred to as coupling stations.

In forming the coupling between adjacent units or sections, a split sleeve 24 is employed, the sleeve parts being cemented or welded together after the assemblage has been made. At the left of FIG. 1, the sleeve has a contour to receive the flange coupling 21, differing in this respect from the coupling sleeve 24', shown at the right of FIG. 1, wherein a different type of pipe coupling is employed at the ends 18' as, for example, a weld 25. At this time, it is pointed out that in all illustrations up to and including FIG. 11, the coupling sleeves will be split and a full showing, at least in part, of this construction is illustrated in FIG. 8. One part of the sleeve 24 has nipples 26 for introduction of foam insulating material 27 into the sleeve, the material 27 being of the same general type and kind as used in the insulation 17. The material 27 is illustrated as stipping in order to draw a clear line of distinction between the prefabricated insulation 17 and the insulation which is applied at the field or other point of installation of the system. The sleeve 24 also includes two fittings 28, through which the cables 20 pass, as well as another cable 29 which extends to and is coupled with a lug 30 welded to the pipe ends 18' adjacent the flanges 21. Both cables 20, 29 extend to suitable transformers externally of the system.

Turning now to the showing in FIG. 2, it will appear that the ends of the cables 20 extend to and are coupled with other lugs 31 at terminal ends of a given cable length, which may involve several of the units or sections 15. For example, at the right of FIG. 1, the cable 20 is shown passing through the coupling sleeve 24' and bridging the welded juncture of the pipe ends 18', as at 25. A suitable strap 32 can be employed on each of the pipe ends 18' for support of the cable 20. The coupling, as in the sleeve 24', includes the insulation 27.

In FIG. 4 of the drawing is diagrammatically shown a positive flange coupling 33 between the pipe ends 18', rather than the insulated coupling, as shown in FIGS. 1 and 2. However, with this type of coupling, a jumper cable 34 is preferably employed between the pipe ends 18', the cable ends being attached to lugs 35 welded to the pipe ends and the cable 20 passes through the coupling sleeve, similar to the showing at the right of FIG. 1 of the drawing. With the showing in FIG. 4, a sleeve 24, similar to the sleeve shown in FIG. 1, is employed and the same insulation, as at 27, is also employed.

In FIGS. 5 and 6 of the drawing is shown another modification, wherein the pipe ends 18' are joined by a pipe coupling 36 and, here again, a jumper cable 34' is employed, similar to the cable 34. With this construction, a coupling sleeve 24' is employed, similar to the sleeve shown at the right of FIG. 1. In FIG. 5, the cable 20 is also shown and, in some instances, cable lengths can be joined together at the coupling stations, as is diagrammatically illustrated at 20' in FIG. 5 of the drawing.

In FIGS. 7 and 10 of the drawings, I have shown modified forms of units or sections 15', particularly wherein a higher degree of insulating properties is required. Considering FIG. 7, it will appear that each of the units or sections comprise an outer tubular casing 37, in which the pipe 38 is arranged and arranged on the pipe 38 is a preformed split sleeve insulation 39, note FIG. 10, the two parts of the sleeve 39 being formed of material similar to the insulating material 17 as, for example, in FIG. 1. The parts are recessed on adjacent surfaces, as seen at 40 in FIG. 10, to receive a conduit 41, generally similar to the conduit 19 and in which the cable 42 is arranged. After this assemblage has been made and positioned within the casing 37, then a final outer body of insulation 43 is formed, which envelops the insulation 39, as clearly illustrated in FIG. 10 of the drawing, the insulation 43 being preferably of a character having a higher temperature rating, in other words, utilized as and when the system is operating under higher temperatures.

Considering FIG. 7 of the drawing, it will appear that the preformed split sleeve insulation 39 extends beyond the insulation 43 and the casing 37 onto part of the projecting ends 38' of the pipe 38. With the showing in FIG. 7, a welded coupling 44 is provided between the pipe ends, particularly in couplings, similar to those shown at the right of FIG. 1 and in FIGS. 4 and 5, wherein the cable 42 simply bridges the pipe coupling as, for example, at 44. With this type of coupling, a split sleeve 24', similar to the sleeve 24' shown in FIGS. 1 and 5, is employed and, in forming the coupling, a preformed split sleeve insulation 45 is arranged over the coupling 44 between ends of the insulations 39 of the units or sections being coupled. The cross-sectional contour of 45 will be generally the same as the cross-sectional contour of the insulation 39, as clearly shown in FIG. 10. At 27' is shown the final poured or injected insulation, similar to the insulation 27, as in FIG. 1 of the drawing.

With various types of installations of the kind under consideration, the insulating medium employed in conjunction with the cable, where it extends longitudinally through the various units or sections and, in fact, through the coupling stations, instead of being a tube, could be of other cross-sectional contours, such as the channel 46 shown in section in FIG. 11. Now turning to FIG. 9 of the drawing, where a coupling station, similar to that shown at the right of FIG. 1 is employed, it will appear that the channel 46 in each unit or section can terminate at the end of the sleeve 16 and the insulation 17 and, between adjacent sections being coupled, a short length 46' of the channel insulation can abut the ends 46 of each unit or section as, for example, at 47 at the right of FIG. 9 and the cable 48 arranged within the channel insulations 46, 46' will be totally shielded and insulated from the pipes 18, as well as the pipe ends 18'. The pipe ends 18' have a weld, as at 25, the same as shown at the right of FIG. 1 of the drawing. In the assemblage of the coupling section, straps 49 can be employed in retaining 46' in position on the pipe ends 18', preparatory to the pouring or otherwise injection of the insulating material 27 into the split sleeve 24'. In lieu of the showing in FIGS. 9 and 11, the cable insulation may be regarded as a cable insulating element, regardless of its cross-sectional contour.

Turning now to FIG. 8 of the drawing, here is illustrated a modified form of cable coupling which is preferably used as and when the cable 50 is not insulated, but otherwise is arranged in an insulating tube or other element 51. In FIG. 8 of the drawing, a coupling sleeve 24, similar to the sleeve shown in FIG. 1, is employed and the units or sections 15 are the same as that shown in FIG. 1. Also the coupling of a cable 29, similar to the cable 29 of FIG. 1, is also the same, but, instead of extending the inlet of the cable 50 directly to the insulating element 51, a special coupling is provided, for example, in a cable 50' coupled with 50 through the medium of a cable connector 52. With this construction, straps 53 of insulating material are arranged on the pipe end 18' in support of the protruding end of the cable 50 in spaced relationship to pipe end 18', the straps 53 being located at opposed sides of the cable connector 52.

With my improved system, it will be apparent that the heat generated in the supply cable is to a very large percentage conducted to the pipe to result in an overall high efficiency in heat conductivity to the medium circulated through the pipes in the uses or sections of the complete system.

Having fully described my invention, what I claim as new and desire to secure by Letters Patent is:

1. A system of the character defined comprising a plurality of insulated pipe units united in spaced coupling stations, each unit comprising an outer casing, a pipe within said casing, the pipe having ends projecting beyond ends of said casing, means insulating the pipe in the casing, each of said stations comprising split sleeves supporting insulating means enveloping the pipe ends and means coupling said pipe ends at said stations, an electric cable in each unit and extending longitudinally of said pipe, an element insulating the cable from said pipe, one end of said cable being coupled with the pipe at predetermined stations, other stations having means introducing the first cable and a second cable coupled with the pipe at said last mentioned stations, both cables at the last named stations extending to an external suitable source of current supply, the third named means of predetermined stations comprising a pipe coupling, and a jumper cable uniting the pipes at such stations.

2. A system as defined in claim 1, wherein the third named means of said last named stations includes insulation between the pipe couplings.

3. A system as defined in claim 1, wherein the element insulating the cable from said pipe comprises a member of insulating material.

4. A system as defined in claim 3, wherein the member insulating the cable from said pipe comprises a channel of insulating material.

5. A system as defined in claim 1, wherein the first named means comprises two insulating bodies, one of said bodies being prefabricated and comprising a split sleeve, and adjacent surfaces of the split sleeve being fashioned to receive the cable in each unit.

6. A system as defined in claim 5, wherein said prefabricated body includes ends extending partially onto the pipe ends of each unit.

7. A system as defined in claim 6, wherein predetermined stations include prefabricated split insulations arranged over the third named means at such stations, and said last named split insulations being fashioned to receive cable extending between adjacent units at such stations.

References Cited

UNITED STATES PATENTS

| | | | |
|---|---|---|---|
| 1,880,794 | 10/1932 | Carter | 219—297 |
| 2,224,403 | 12/1940 | Limes | 219—300 |
| 2,761,949 | 9/1956 | Colton | 219—300 |
| 2,894,538 | 7/1959 | Wilson | 138—149 X |

FOREIGN PATENTS

| | | |
|---|---|---|
| 756,945 | 9/1956 | Great Britain. |
| 962,180 | 7/1964 | Great Britain. |

ANTHONY BARTIS, *Primary Examiner.*